United States Patent [19]

Shigekane

[11] Patent Number: 5,115,388
[45] Date of Patent: May 19, 1992

[54] TEMPERATURE RESPONSE PROTECTION CIRCUIT FOR BRIDGE INVERTER

[75] Inventor: Hisao Shigekane, Matsumoto, Japan
[73] Assignee: Fuji Electric Co., Ltd., Japan
[21] Appl. No.: 661,513
[22] Filed: Feb. 26, 1991

[30] Foreign Application Priority Data

Feb. 26, 1990 [JP] Japan .................. 2-45016

[51] Int. Cl.⁵ ........................... H02H 7/122
[52] U.S. Cl. ..................... 363/56; 361/106; 363/132
[58] Field of Search ............ 363/56, 58, 96, 98; 361/106

[56] References Cited

U.S. PATENT DOCUMENTS

| | | | |
|---|---|---|---|
| 4,360,852 | 11/1982 | Gilmore | 361/106 |
| 4,965,710 | 10/1990 | Pelly et al. | 363/56 |

FOREIGN PATENT DOCUMENTS

| | | | |
|---|---|---|---|
| 2803557 | 8/1979 | Fed. Rep. of Germany | 361/106 |
| 155275 | 2/1982 | German Democratic Rep. | 363/58 |
| 134705 | 3/1989 | German Democratic Rep. | 361/106 |
| 121991 | 6/1985 | Japan | 363/56 |

OTHER PUBLICATIONS

Crisafi et al, "Thermistor-Module Thermoprotector," IBM Tech. Discl. Bul., vol. 12, No. 7, pp. 906, 907, Dec. 1969 (361-106).

Primary Examiner—William H. Beha, Jr.
Attorney, Agent, or Firm—Brumbaugh, Graves, Donohue & Raymond

[57] ABSTRACT

In an inverter which converts a DC voltage input into AC voltage outputs of different phases, power transistors are arranged in an upper arm and a lower arm of the inverter. The temperatures of the power transistors in the upper arm are monitored by individual temperature sensors connected to overheat protection circuits. When an overcurrent flows through any one of the power transistors in the upper arm in a short-circuit situation, that power transistor is overheated. An alarm signal is initiated by the corresponding overheat protection circuit once the temperature of the power transistor is sensed to have exceeded a predetermined value. In response to this alarm signal, all of the power transistors are turned off and, thus, accorded protection.

10 Claims, 6 Drawing Sheets

OC: OVERCURRENT PROTECTION CIRCUIT
OC1: OVERCURRENT PROTECTION CIRCUIT WITH ALARMING CIRCUIT
DR: BASE DRIVING CIRCUIT
H: TEMPERATURE SENSOR
OH: OVERHEATING PROTECTION CIRCUIT

OC: OVERCURRENT PROTECTION CIRCUIT
OC1: OVERCURRENT PROTECTION CIRCUIT WITH ALARMING CIRCUIT
DR: BASE DRIVING CIRCUIT
H: TEMPERATURE SENSOR
OH: OVERHEATING PROTECTION CIRCUIT (P_w: PULSE WIDTH)

| SHORT-CIRCUIT PATH | CAUSE |
|---|---|
| ARM SHORT-CIRCUIT | BREAKDOWN OF TRANSISTOR OR DIODE |
| SERIES ARM SHORT-CIRCUIT | FAILURE IN CONTROL CIRCUIT OR DRIVING CIRCUIT, OR MALFUNCTIONING DUE TO NOISE |
| OUTPUT SHORT-CIRCUIT | HUMAN-INITIATED FAILURE SUCH AS MISWIRING, OR ELECTRIC BREAKDOWN OF LOAD |
| GROUND | SAME AS ABOVE |

TEMPERATURE RESPONSE PROTECTION CIRCUIT FOR BRIDGE INVERTER

TECHNICAL FIELD

The present invention relates to an overcurrent protection circuit for a semiconductor device such as an inverter, and more particularly to a protection circuit having a reduced number of circuit components relative to a similar prior art circuit.

The same reference numerals and characters are hereinafter used to designate the same corresponding parts in the accompanying drawings.

PRIOR ART AND BACKGROUND OF THE INVENTION

FIG. 9 shows a conventional arrangement wherein base driving circuit DR controls power transistor TR, which is used as a switching power device. TR includes NPN power transistors connected to each other in a Darlington arrangement. Driving power source 3 supplies power to base driving circuit DR. Si1 and Si2 denote input terminals of the base driving circuit to which driving signal S is applied. Driving signal S controls the on-off states of power transistor TR. In this arrangement, the power transistor is on only when photo-coupler PC1 is turned on, and it is off otherwise.

FIG. 8 shows an exemplary inverter circuit which comprises a multiplicity of base driving circuits each identical to base driving circuit DR of FIG. 9. It also comprises power transistors TR1, TR2, TR3, TR4, TR5 and TR6 each identical to power transistor TR of FIG. 9.

In FIG. 8, TR1-TR6 are power transistors of an NPN type which are connected in a bridge arrangement to form a three-phase inverter for driving induction motor IM. This inverter converts DC electric power or voltage into AC voltages of three phases, which are denoted U, V, and W. The DC power is applied between main DC electrodes denoted positive line (+) LP and negative line (−) LN. The AC voltage of each phase is individually supplied to IM from a connection point (or midpoint) between upper and lower arms in the bridge arrangement. As shown in FIG. 8, transistors TR1, TR3 and TR5 are in the upper arm. Because the negative electrodes of their corresponding driving power supplies 3 are respectively connected to AC output lines of different electric potentials due to the different phases involved, driving power supplies 3 are required to be insulated from one another. By contrast, only one driving power supply 3 may be required for transistors TR2, TR4 and TR6 in the lower arm, because the negative electrodes of their corresponding driving power supplies 3 are all connected to the negative line (−) LN of the main DC power supply which has a fixed electric potential. This being so, this inverter circuit in a three-phase bridge arrangement may comprise a minimum of four driving power supplies—three for the upper arm and one for the lower arm.

Turn now to FIG. 7 which illustrates different situations where short-circuits occur and the causes associated therewith. These short circuits, which are characterized by their short-circuit paths, are, for example, an arm short-circuit, a series arm short-circuit, an output short-circuit and ground.

FIG. 6 shows the so-called "overload safe operation area (OLSOA)" of a power transistor in its characteristic plot of collector-emitter voltage ($V_{CE}$) vs. collector current ($I_{cp}$). The OLSOA is important when any one of the aforementioned short-circuit situations arises. In one such situation, an overcurrent flows through power transistor TR, and the power transistor breaks down once the locus or the value of $I_{cp}$ falls outside of the OLSOA. This being so, the power transistor has to be immediately turned off upon detecting the overcurrent. This can be accomplished by a circuit shown in FIG. 5.

FIG. 5 illustrates a basic, base driving circuit with an overcurrent protection capability. In FIG. 5, the broken line encloses overcurrent protection circuit OC. The power-transistor protection using the circuit of FIG. 5 is realized as follows:

(1) Driving signal S is applied to terminals Si and O for turning on power transistor TR. The driving signal charges capacitor C1 through resistor R1, thereby simultaneously turning on power transistor TR through resistor R2.

(2) Power transistor TR, in a normal operation, has a much lower saturated collector-emitter voltage $V_{CE}$(sat) than the avalanche voltage of zener diode ZD. This being so, capacitor C1 discharges toward collector C of power transistor TR through diode D2.

(3) In a short-circuit situation, an excessive current starts to flow through power transistor TR, thereby raising $V_{CE}$(sat) of TR above the avalanche voltage of zener diode ZD. As a result, capacitor C1 is prevented from discharging toward power transistor TR.

(4) Consequently, the voltage of capacitor C1 is raised above the avalanche voltage of zener diode ZD, thereby turning on auxiliary transistor Q2 and lowering the base-emitter voltage of power transistor TR to the saturated collector-emitter voltage $V_{CE}$(sat) This results in turning power transistor TR off.

FIG. 3 illustrates a conventional base driving (in this instance, gate driving) circuit with an overcurrent protection capability, wherein an insulated gate bipolar transistor (IGBT), which is equivalent to power transistor TR in FIG. 5, is used as a switching power device. In FIG. 3, the broken line encloses an overcurrent protection circuit denoted OC, and the rest of FIG. 3 describes base driving circuit denoted DR. The basic function of the circuit of FIG. 3 is same as that of FIG. 5. However, driving signal S in FIG. 3 is provided through photo-coupler PC1 identical to that in FIG. 9, and base driving circuit DR in FIG. 3 is relatively complex, compared with that in FIG. 5.

The circuit of FIG. 3, however, lacks a way of indicating the activity of overcurrent protection circuit OC to the outside thereof. Thus, this circuit is normally provisioned with alarming circuit ALMG as shown in FIG. 4. For the sake of convenience, the overcurrent protection circuit in FIG. 4, supported by the alarm circuit, is hereinafter referred to as overcurrent protection circuit with alarming circuit OC1.

In a conventional three-phase inverter circuit, alarm signal ALM in FIG. 4 is applied to a driving signal generating circuit for cutting off driving signal S so as to simultaneously turn off the six switching power devices. These switching power devices are thus protected, notwithstanding that an overcurrent flows through only a subset of them.

The conventional overcurrent protection circuit described above has the following shortcomings. When the base driving circuit with the alarm capability in FIG. 4 is used in the three phase inverter circuit in FIG. 8, the leads for transporting, to a controlling apparatus, alarm signals ALM for individual power transistors need to be insulated from one another. This controlling apparatus (for example, a microcomputer) controls the driving signals to the six transistor elements. The need of insulation stems from the fact that the electric potentials of driving power supplies 3 for individual transistors TR1, TR3 and TR5 in the upper arm are different not only from those for transistors TR2, TR4 and TR6 in the lower arm, but also from one another. As a result, a total of at least four photocouplers, each identical to PC2 of FIG. 4, are needed for the alarming purposes in the inverter circuit. This arrangement undesirably calls for a complex circuit with a significant number of components. Accordingly, it is desirable to simplify the protection circuit to reduce the number of components.

SUMMARY OF THE INVENTION

The invention overcomes the prior art limitations by detecting an overcurrent state using temperature sensors. In accordance with the invention, the temperature sensors are employed to monitor the temperature of the switching power devices in the upper arm of an inverter. As the temperature of one such device rises above a predetermined value due to an overheating condition in the overcurrent state, an alarm signal is generated. As such, the use of photo-couplers for outputting the alarm signals as in the prior art is eliminated, at least for those switching power devices in the upper arm. Advantageously, an overcurrent protection circuit incorporating the present invention is relatively simple in the absence of the photo-couplers. In addition, it is unnecessary to use power switching devices which can withstand high voltages due to changes in electric potential.

The meaning of symbols used in the figures is as follows:

TR&TR1-TR6: Power transistors
OC: Overcurrent protection circuit,
OC1: Overcurrent protection circuit with alarming circuit;
DR: Base driving circuit,
H: Temperature sensor,
OH: Overheating protection circuit,
G1: OR circuit, and
ALM0, ALM1, ALM2: Alarming signals.

DETAILED DESCRIPTION OF THE PREFERRED EMBODIMENTS

A preferred particular embodiment of the invention includes:

a semiconductor device (such as an inverter) which comprises switching power device chips, each of which has at least a first terminal and a second terminal (such as a collector and an emitter, respectively), and a control terminal (such as a base or a gate) for turning on and off a circuit between the first and second terminals (hereinafter referred to as a main circuit) in response to a control signal applied between the second terminal and the control terminal, with first and second of the switching power device chips being connected to form a series circuit in which the main circuits are connected in series with the same polarity, one or more of the series circuits connected in parallel with the same polarity being contained in one package, and a plurality of the series circuits being connected in parallel with the same polarity;

means for outputting AC voltages from connecting points (hereinafter referred to as midpoints) of the first and second switching power device chips in the series circuits upon application of a DC voltage between both terminals of the parallel connected series circuits; and a protection circuit further comprising:

temperature sensors (such as H) for detecting the temperature of each of a plurality of the switching power device chips, the number of temperature sensors being equal to or smaller than the total number of the first switching power device chips (whose second terminals are connected to the midpoints), means (such as an overcurrent protection circuit OH) for generating a first alarm signal (such as ALM2) upon determination that a temperature monitored by any one of the temperature sensors exceeds a predetermined first value, the generating means being equipotentially coupled to a point (hereinafter referred to as a point of electric potential reference) to which the second terminals of the second switching power device chips in the series circuits are connected, means (such as an overcurrent protection circuit with alarming circuit) for generating a second alarm signal (such as ALM1), e.g., upon determination either that the main-circuit current in each of the second switching power device chips (whose second terminals are connected to the point of reference potential) exceeds a predetermined second value, or else that the sum of these main-circuit currents exceeds a predetermined third value, and means for obtaining an OR condition (such as OR circuit G1) for the first and second alarm signals.

Figure 1:
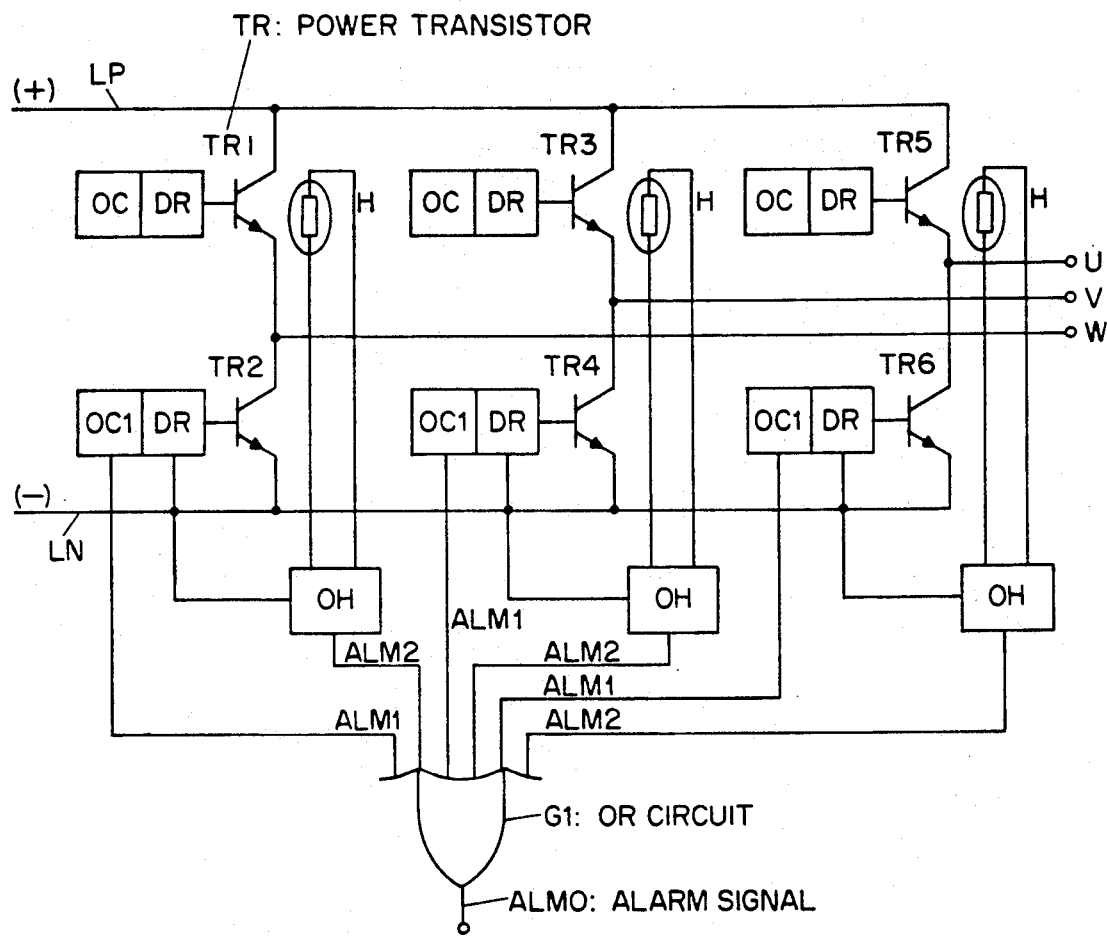
FIG. 1 is a schematic circuit diagram of a preferred embodiment of the present invention.
Figure 2:
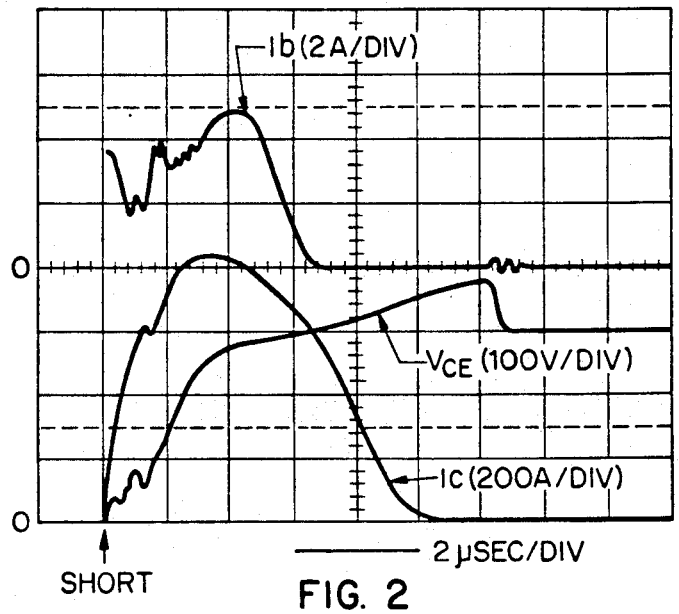
FIG. 2 shows signal waveforms for explaining the operation of the circuit of FIG. 1.
Figure 3:
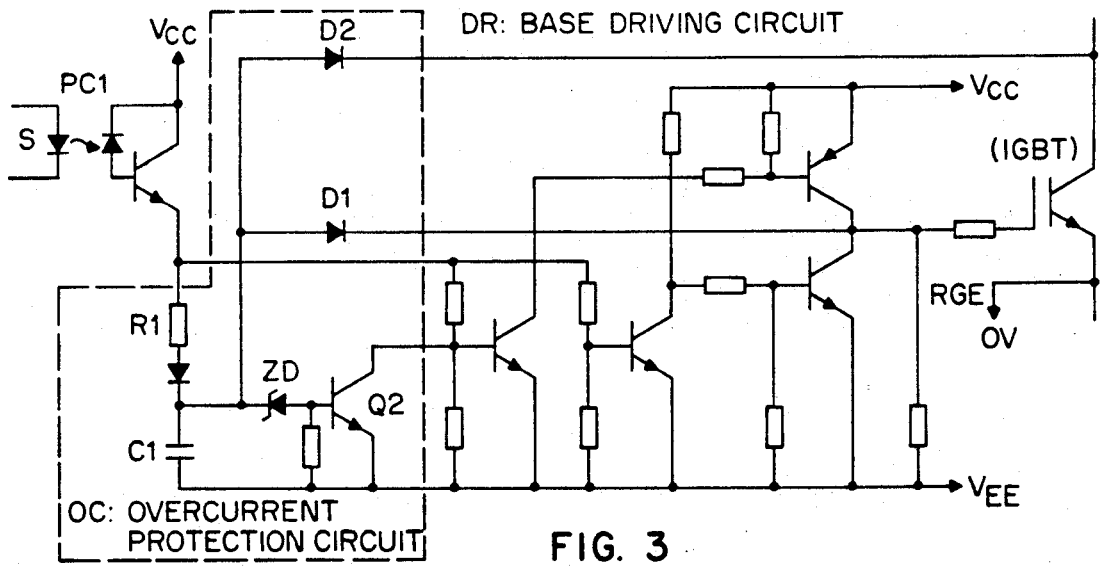
FIG. 3 is a detailed diagram of a preferred base driving circuit with an overcurrent protecting capability.
Figure 5:
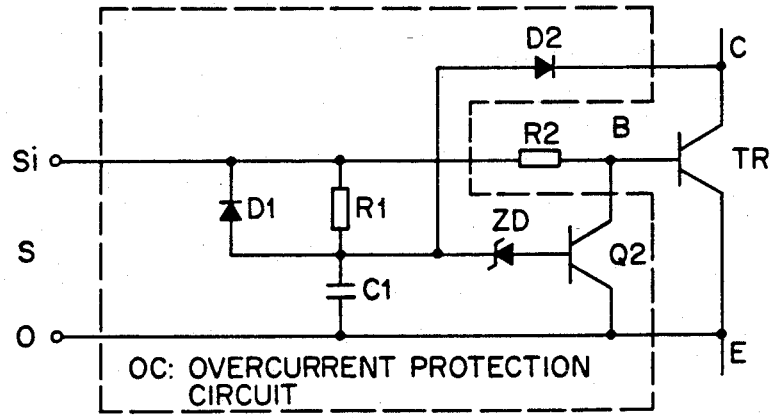
FIG. 5 is a schematic diagram of a preferred, base driving circuit with an overcurrent protecting capability.
Figure 4:
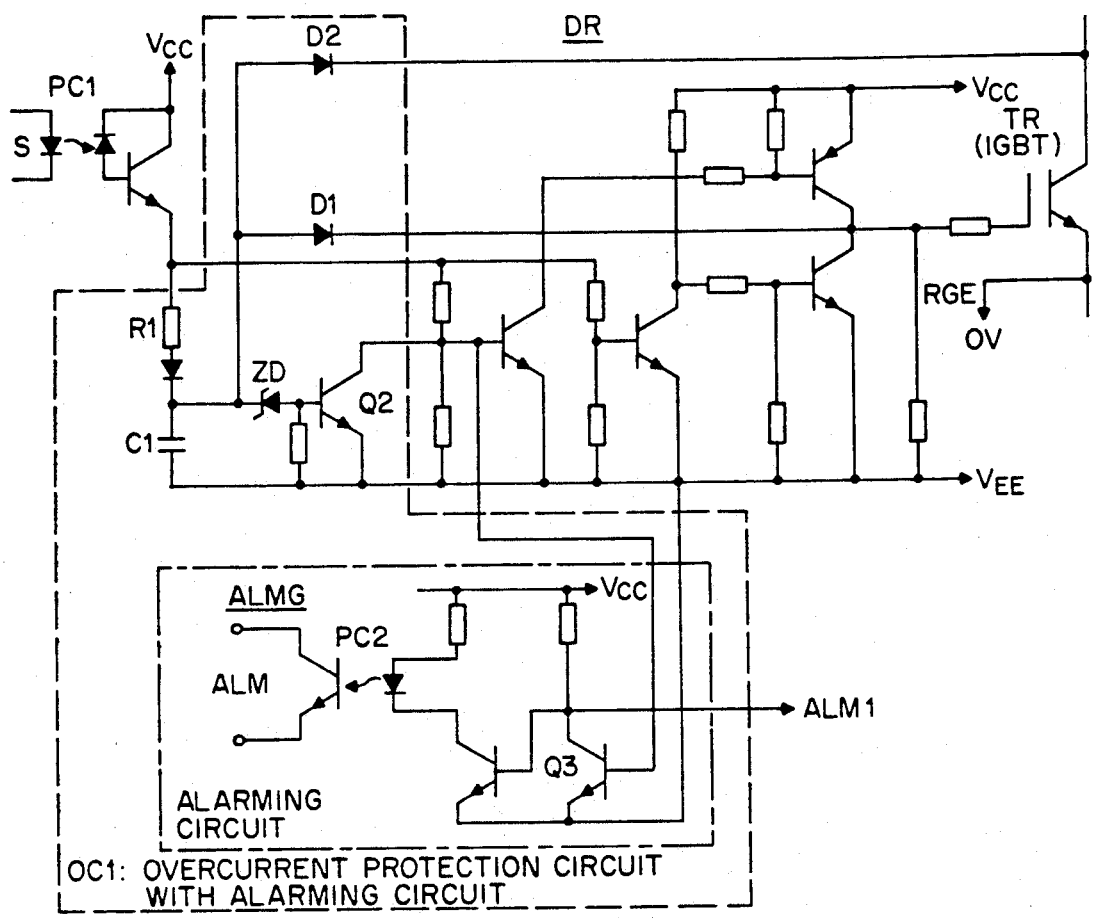
FIG. 4 is a detailed diagram of a preferred circuit including an alarming circuit for use with the circuit of FIG. 3.
Figure 6A:
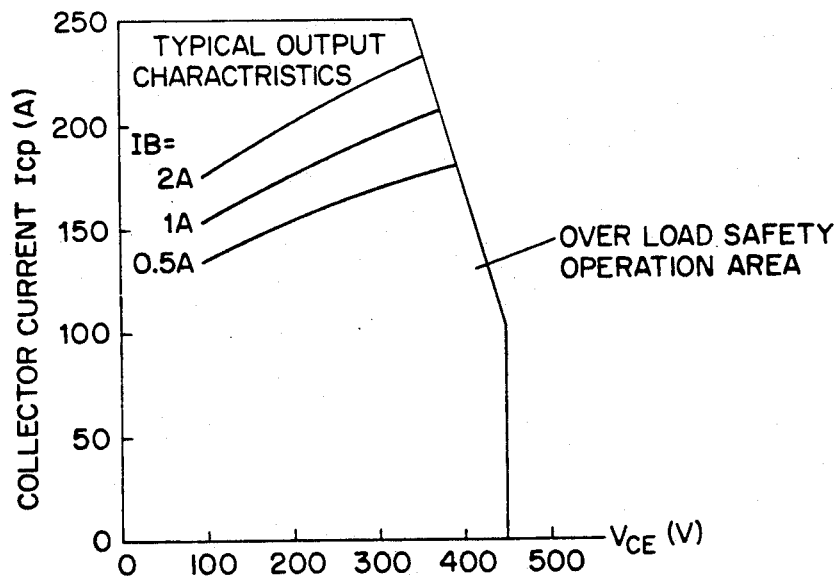
FIGS. 6A and 6B, illustrate an overload safety operation area of a power transistor.
Figures 6B, 7:
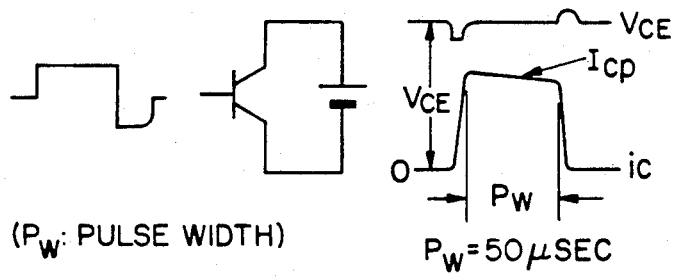
FIG. 7 illustrates various short-circuit situations of an inverter.
Figure 8:
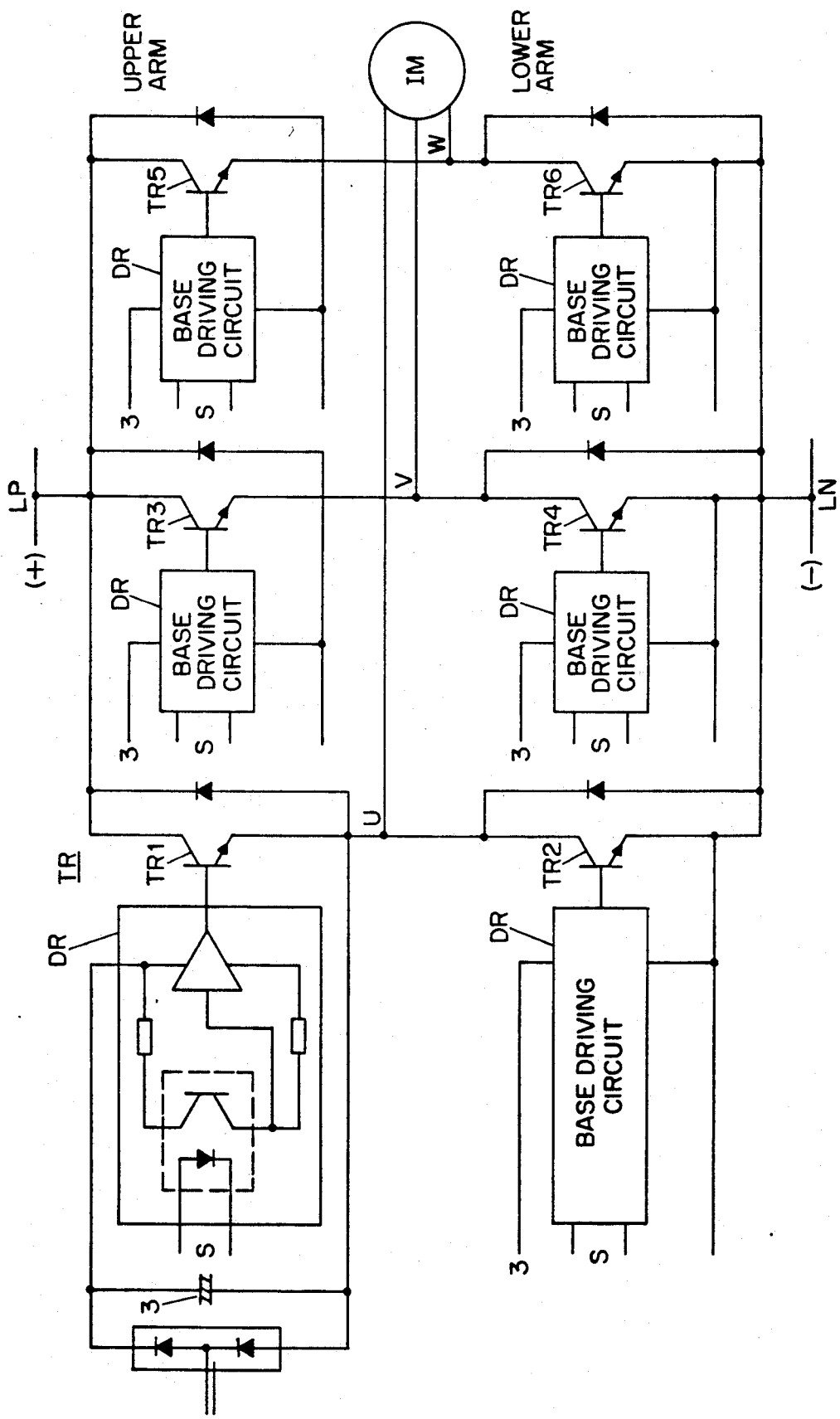
FIG. 8 is a diagram of a conventional three phase inverter circuit in a bridge arrangement.
Figure 9:
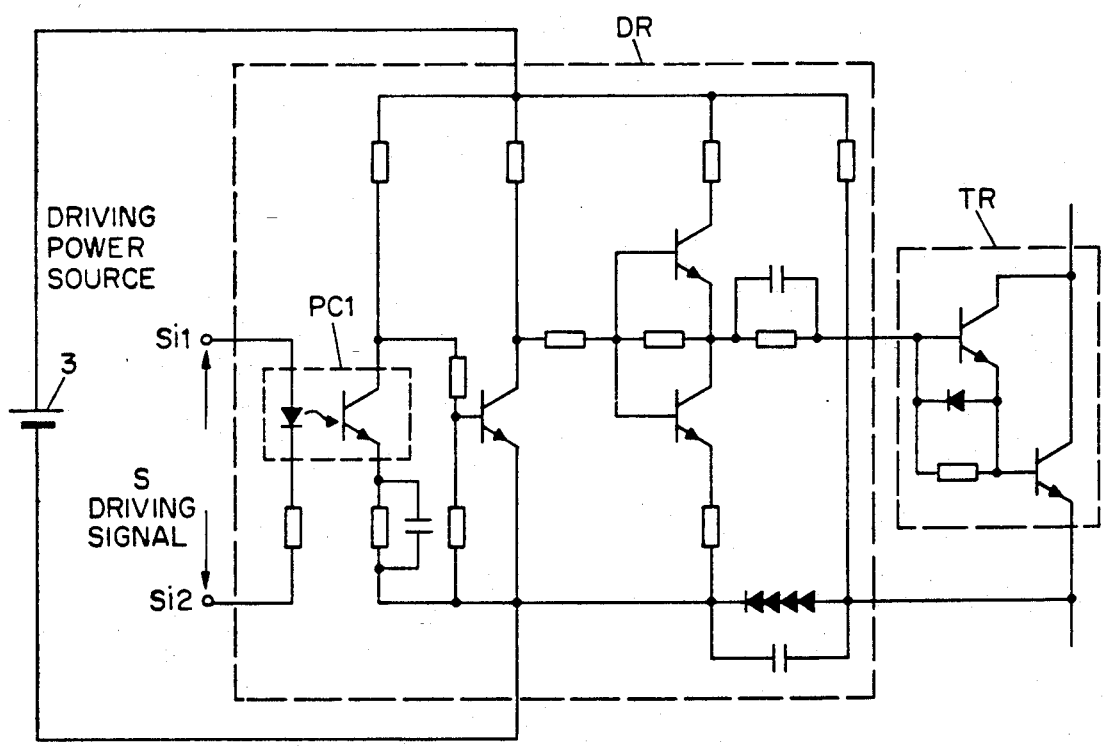
FIG. 9 is a diagram of a conventional base driving circuit for a power transistor.

Such a preferred embodiment of the present invention will now be described by referring to FIGS. 1-4. FIG. 1 schematically shows an exemplary preferred circuit of the present invention. FIG. 2 shows waveforms of base current $I_B$, collector current $I_C$, and collector-emitter voltage $V_{CE}$ of the power transistor during the time in which an overcurrent protection is effected by the circuits of FIGS. 3-5.

In FIG. 1, power transistors TR1-TR6, which constitute an inverter circuit in a three phase bridge arrangement are, in this case, each in the form of a chip. These six chips are contained in a package. Each base driving circuit DR with overcurrent protection circuit OC for each of power transistors TR1, TR3 and TR5 is identical to that in FIG. 3 which does not output any alarm signal. By contrast, the overcurrent protection circuits for respective power transistors TR2, TR4 and TR6 in the lower arm output alarm signals ALM1, and these circuits may each be overcurrent protection circuit with alarming circuit OC1 in FIG. 4 without any modification. Each alarm signal ALM1 may be taken out directly from the alarming circuit without being relayed through photo-coupler PC2. For example, it may be taken out from the collector of transistor Q3 in the previous stage. This stems from the fact that the emitter of each of power transistors TR2, TR4 and TR6 is commonly connected to the negative line (−) LN of a main DC power supply, which is a point of electric potential reference. Thus, in accordance with a feature of the preferred embodiment, photo-coupler PC2 may be eliminated from overcurrent protection circuit with alarming circuit OC1 of FIG. 4. The three alarm signals ALM1 are provided to OR-circuit G1. It should be pointed out that base driving circuits DR in the lower arm for power transistors TR2, TR4 and TR6 are identical to those shown in FIGS. 3 or 4.

Temperature sensors H, which may be thermistors, are disposed in proximity of the chips or elements containing respective power transistors TR1, TR3 and TR5. Each temperature sensor H is coupled to OR-circuit G1 through overheat protection circuit OH whose negative terminal is connected to the negative line (−) LN of the main DC power supply, which is, again, a point of electric potential reference.

As an overcurrent flows through any one of power transistors TR1, TR3 and TR5 in the upper arm, its collector current $I_C$ and emitter voltage $V_{CE}$ vary as shown in FIG. 2. This causes overheating of the power transistor. At the same time, overcurrent protection circuit OC associated with that power transistor reacts to turn off the driving signal which is directly applied thereto. This condition is latched or set since auxiliary transistor Q2 in OC is kept being turned on by continuous discharging of capacitor C1. However, the set condition dissolves when the pulsed, driving signal S, which is applied to base driving circuit DR for the power transistor element, becomes off. This is attributed to the fact that capacitor C1 is no longer charged through resistor R1 but discharges through Q2, thereby decreasing its voltage below the avalanche voltage of zener diode ZD. As a result, Q2 is turned off, and driving signal S becomes on again. This allows the overcurrent to flow and reheat the power transistor element. Again, $I_C$ and $V_{CE}$ of this power transistor element have the waveforms as described in FIG. 2.

By turning driving signal S on and off repeatedly, any one of elements TR1, TR3 and TR5, through which the overcurrent flows, is overheated. When the temperature of the overheated element exceeds a predetermined value, overheat protection circuit OH initiates alarm signal ALM2 to OR-circuit G1. Thus, an alarm signal caused by an overcurrent flowing through any one of power transistors TR1-TR6 is fed to OR-circuit G1. The output of OR-circuit G1, which is alarm signal ALM0, is forwarded to a microcomputer (not shown in the figure). This microcomputer causes the overcurrent protection circuits to turn off driving signals S, which are transmitted to the six transistors through photo-couplers, by which the signal transmission lines are insulated from the main circuitry. Accordingly, transistors TR1-TR6 are turned off simultaneously and, thus, accorded protection.

The foregoing merely illustrates the principles of the invention and it is, thus, appreciated that those skilled in the art will be able to devise numerous arrangements which, although not explicitly shown or described herein, embody the principles of the invention. By way of example, but not limitation, some possible variations and alternatives will now be described.

For example, in FIG. 1, the power transistors are used as switching devices. However, these switching devices are not limited to the power transistors used but any switching devices of a self-turn-off type which may be desirable in a particular application.

In addition, the actual number of temperature sensors H may be smaller than that of the power transistors. For example, it may take only two sensors to accomplish the overcurrent protection if, in fact, power transistors TR1, TR3 and TR5 are so closed to one another that the sensors can be disposed between them.

Moreover, in FIG. 1, each of power transistors TR2, TR4 and TR6 in the lower arm is provided with an individual overcurrent protection circuit OC1. However, the emitters of these three power transistors can be coupled together to a terminal which is connected, through an additional shunt resistor, to the negative line (−) LN of the main DC power supply. An increase in the voltage of this shunt resistor is detected and need be communicated to only one overcurrent protection circuit which simultaneously turns off the three transistor elements in the lower arm, thereby accomplishing the overcurrent protection.

Another way of achieving the overcurrent protection is to detect any excessive $V_{CE}(\text{sat})$ of power transistors TR2, TR4 and TR6 by an overcurrent protection circuit. This circuit has three diodes D2 respectively connected in parallel to the collectors of the three transistor elements, which are simultaneously turned off upon the detection of the excessive voltage.

Without any departure from the present invention, two different OR-circuits may be employed. Specifically, one of the OR-circuits receives alarm signals ALM1s from overcurrent protection circuits OC for the respective power transistors in the lower arm, and the other receives alarm signals ALM2 from the respective overheating protection circuits OH.

Finally, temperature sensors H are not necessarily included in the same package as TR1, TR3 and TR5 and may be disposed outside of the package, as long as they are so positioned that they can effectively detect the overheating of TR1, TR3 and TR5.

We claim:

1. A semiconductor device for converting direct current into alternating current, comprising a plurality of parallel-connected pairs of series-connected power transistors,
    each pair of power transistors comprising a first transistor whose base is connected to a common positive input terminal, and a second transistor whose emitter is connected to a common negative input terminal,
    said device further comprising first and second overcurrent protection means respectively associated with first and second transistors,
    said first overcurrent protection means comprising temperature sensing means, and said second overcurrent protection means comprising current sensing means.

2. The semiconductor device of claim 1 wherein each of said plurality of switching elements is a power transistor.

3. The semiconductor device of claim 1 wherein said power transistor is of an NPN type.

4. The semiconductor device of claim 1 wherein said power transistor is an insulated gate bipolar transistor.

5. The semiconductor device of claim 1 wherein said temperature sensing means comprises a thermistor.

6. The semiconductor device of claim 1 wherein said overcurrent protection means further comprises means for determining an alarm condition in response to first and second alarm signals.

7. The semiconductor device of claim 6 wherein said determining means is a circuit performing a logical OR function.

8. In a semiconductor device which comprises a plurality of stages each further comprising first and second switching elements, each of which has at least a first terminal and a second terminal, the second terminal of the first switching element being connected to the first terminal of the second switching element at a connection point, said semiconductor device outputting a different voltage at said connection point, a protection circuit comprising means for sensing temperatures of first switching elements in said plurality of stages;

means for generating a first alarm signal in response to a sensed temperature exceeding a predetermined value;

means for initiating a second alarm signal in response to an overcurrent flowing through any one of second switching elements in said plurality of stages, said overcurrent exceeding another predetermined value; and means for determining an alarm condition in response to alarm signals provided by said generating means and said initiating means.

9. The semiconductor device of claim 8 wherein said first switching elements is greater than or equal to the number of said sensing means.

10. The semiconductor device of claim 8 wherein said determining means is a circuit performing a logical OR function.

* * * * *